United States Patent

Biseli et al.

[11] Patent Number: 5,483,112
[45] Date of Patent: Jan. 9, 1996

[54] ROTOR END TURN VENTILATION STRUCTURE

[75] Inventors: Kathleen M. Biseli, Oviedo, Fla.; Cliff A. Welborn, Fort Payne, Ala.; Albert C. Sismour, Jr., Casselberry; Lon W. Montgomery, Winter Springs, both of Fla.

[73] Assignee: Westinghouse Electric Corporation, Pittsburgh, Pa.

[21] Appl. No.: 176,343

[22] Filed: Dec. 30, 1993

[51] Int. Cl.$^6$ ................................ H02K 1/32; H02K 3/24
[52] U.S. Cl. ................................................. 310/61; 310/58
[58] Field of Search ............................ 310/58, 59, 60 R, 310/60 A, 61, 270

[56] References Cited

U.S. PATENT DOCUMENTS

| | | | |
|---|---|---|---|
| 2,986,664 | 5/1961 | Willyoung et al. | 310/61 |
| 3,322,985 | 5/1967 | Azbukin et al. | 310/61 |
| 3,395,299 | 7/1968 | Quay et al. | 310/261 |
| 3,660,702 | 5/1972 | Kishino | 310/61 |
| 3,995,180 | 11/1976 | Giles | 310/61 |
| 4,298,812 | 11/1981 | Damiron et al. | 310/61 |
| 4,363,982 | 12/1982 | Kaminski | 310/61 |
| 4,543,503 | 9/1985 | Kaminski et al. | 310/59 |
| 4,634,910 | 1/1987 | Schöllhorn | 310/61 |
| 4,814,655 | 3/1989 | Kaminski | 310/59 |

FOREIGN PATENT DOCUMENTS

| | | |
|---|---|---|
| 679856 | 8/1939 | Germany . |
| 51354 | 11/1965 | Germany . |
| 256398 | 5/1988 | Germany . |

OTHER PUBLICATIONS

J. J. Gibney, III, "GE Generators—An Overview", GE Industrial & Power Systems, Schenectady, N.Y., 1992, pp. 1–14.

Primary Examiner—Clayton E. LaBelle

[57] ABSTRACT

An improved rotor end winding assembly for an electrodynamic apparatus includes a stack of conductive straps that are configured to turn about an end turn portion of a rotor and include a top strap, a bottom strap and a number of intermediate straps that are stacked between the top strap and the bottom strap. A space defined between the rotor shaft and the bottom strap is divided into a high pressure zone and a low pressure zone by a zone block. A stepped coolant passage defined in the stack includes an ascending passage that leads from the high pressure zone toward the top strap and in the direction of the zone block and low pressure zone, and a descending passage that leads from the ascending passage to the low pressure zone. As a result, coolant will flow from the high pressure zone to said low pressure zone to efficiently cool said stack of straps.

12 Claims, 2 Drawing Sheets

ROTOR END TURN VENTILATION STRUCTURE

BACKGROUND OF THE INVENTION

1. Field of the Invention

This invention relates to the design of large electrodynamic equipment, such as electrical generators. More specifically, this invention relates to an improved cooling system for the end turn region of a strap-wound rotor coil in an air-cooled electrical generator.

2. Description of the Prior Art

Economic concerns dictate that large, air-cooled electrical generators of the type that are manufactured by the assignee of this invention, Westinghouse Electric Company, be designed to as high a power density as possible, as well as being simple to manufacture.

The higher the power density of an electrical generator, the more heat that is produced in the stator and rotor windings during normal operation. The need to conduct waste heat away from the stator and rotor windings thus operates as a significant constraint to the power density that can be achieved.

Traditionally, the end turn region of strap-wound rotor windings have been difficult to effectively cool. One method of cooling the end turns involves machining ventilation channels into fiberglass blocking that is located between the coil end turns, thus conducting heat away from the side surfaces of the coils. However, the effectiveness of such ventilation channels is limited, and is inadequate to provide the cooling that would is necessary at the level of power densities that the designers of such equipment are trying to achieve.

It is clear that there is a long and unfilled need in the prior art for an improved method and system for cooling the end turn regions of strap-wound rotor coils in an electrical generator.

SUMMARY OF THE INVENTION

Accordingly, it is an object of the invention to provide an improved method and system for cooling the end turn region of strap-wound rotor coils in an electrical generator.

In order to achieve the above and other objects of the invention, an improved winding for an electrodynamic apparatus such as an electrical generator includes a first conductive strap; a second conductive strap that is in contact with and overlays the first conductive strap; a first hole defined in the first conductive strap; and a second hole defined in the second conductive strap; wherein the second hole is in communication with the first hole, and the first and second holes are displaced from each other so that a portion of the first conductive strap overlays the second hole, and a portion of the second conductive strap overlays the first hole, whereby a stepped passage is defined for a coolant through the first and second straps, the stepped passage having more surface area exposed for heat transfer with a coolant than a non-stepped passage would have.

According to a second aspect of the invention, an improved rotor winding end turn assembly for an electrodynamic apparatus such as electrical generator includes a stack of a plurality of conductive straps, the stack of straps and each strap therein being constructed and arranged to turn about an end turn portion of a rotor in an electrodynamic apparatus; a stepped passage defined in the stack for coolant, the stepped passage being defined by a plurality of holes formed, respectively, in the straps, the holes being positioned so that a first hole in a first strap is in communication with a second hole in a second, adjacent strap, and so that the first and second holes are displaced from each other so that a portion of the first strap overlays the second hole, and a portion of the second strap overlays the first hole, whereby the stepped passage has a larger surface area exposed for heat transfer with a coolant than a non-stepped passage would have.

According to a third aspect of the invention, an improved rotor end winding assembly for an electrodynamic apparatus such as an electrical generator includes a rotor shaft; a stack of a plurality of conductive straps, the stack of straps having an end turn portion, the stack of straps including a top strap, a bottom strap and a number of intermediate straps that are stacked between the top strap and the bottom strap; a space defined between the rotor shaft and the bottom strap; the space being divided into a high pressure zone and a low pressure zone by a zone block; and a coolant passage defined in the stack, the coolant passage including an inlet hole defined in the bottom strap adjacent to the high pressure zone; a number of ascending holes defined, respectively, in a number of the intermediate straps defined in ascending passage that leads toward the top strap and in the direction of the zone block and low pressure zone;

an outlet hole defined in the bottom strap adjacent to the low pressure zone; and a number of descending holes that define a descending passage that is in communication with the ascending passage at a first end and with the outlet hole at a second end, whereby coolant will flow from the high pressure zone to the low pressure zone to efficiently cool the stack of straps.

According to a fourth aspect of the invention, an electrical generator assembly that has improved cooling characteristics that permits a higher power density, includes a stator; a rotor mounted for rotation within the stator, the rotor having a rotor shaft; a stack of a plurality of conductive straps, the stack of straps having an end turn portion, the stack of straps including a top strap, a bottom strap and a number of intermediate straps that are stacked between the top strap and the bottom strap; a space defined between the rotor shaft and the bottom strap, the space being divided into a high pressure zone and a low pressure zone by a zone block; and a stepped coolant passage defined in the stack, the stepped coolant passage including an inlet hole defined in the bottom strap adjacent to the high pressure zone; a number of overlapping ascending holes defined, respectively, in a number of the intermediate straps to define an ascending passage that leads toward the top strap and in the direction of the zone block and low pressure zone; an outlet hole defined in the bottom strap adjacent to the low pressure zone; and a number of overlapping descending holes that define a descending passage that is in communication with the ascending passage at a first end and with the outlet hole at a second end, whereby coolant will flow from the high pressure zone to the low pressure zone to efficiently cool the stack of straps.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

DETAILED DESCRIPTION OF THE PREFERRED EMBODIMENT(S).

Figure 1:
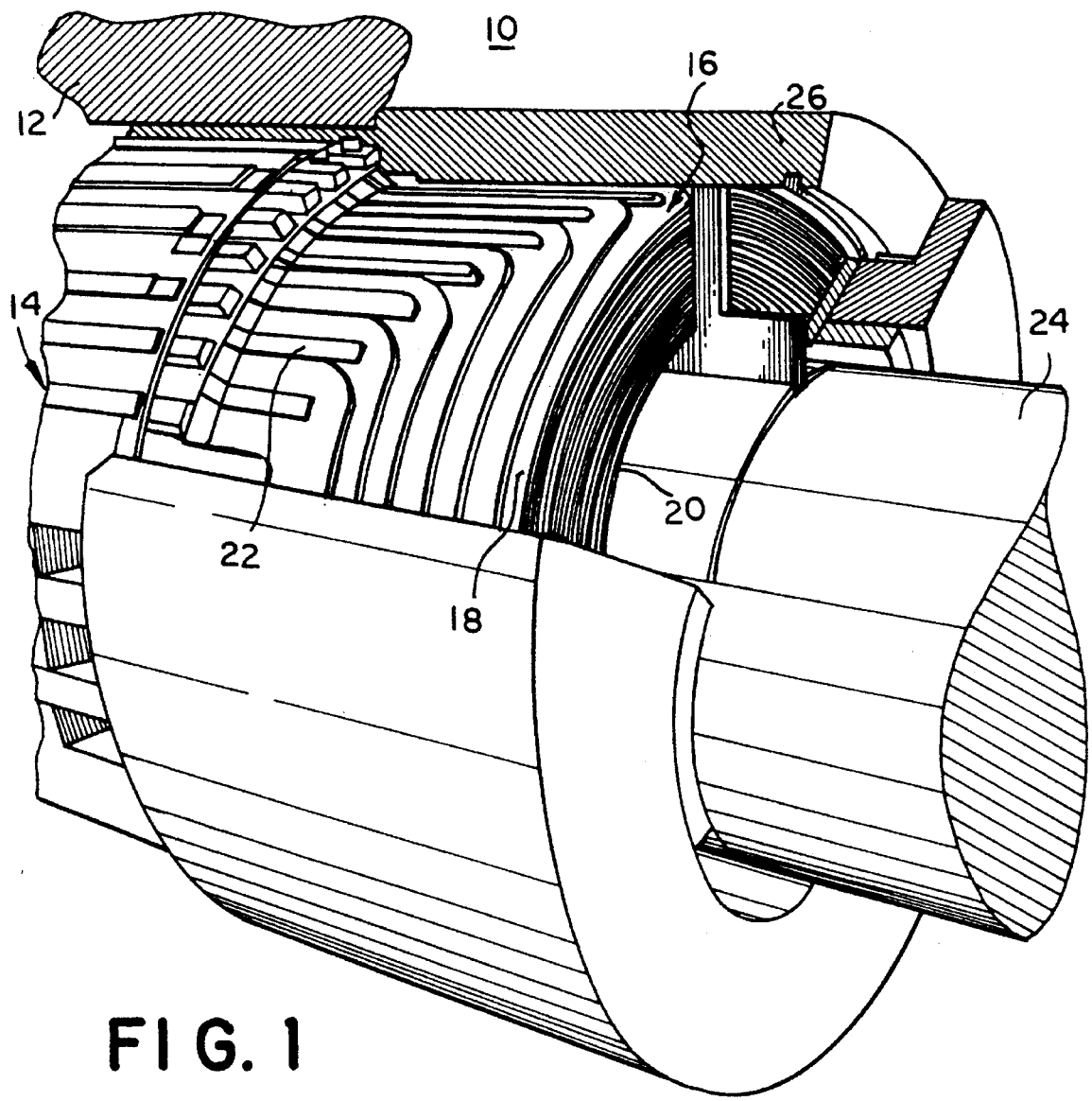
FIG. 1 is a fragmentary perspective view of an electrical generator assembly that is constructed according to a preferred embodiment of the invention, partly in schematic, and with parts broken away for clarity.

Referring now to the drawings, wherein like reference numerals designate corresponding structure throughout the views, and referring first to FIG. 1, an electrical generator assembly 10 that is constructed according to a preferred embodiment of the invention includes a stator assembly 12 and a rotor assembly 14 that is mounted for rotation within the stator assembly 12.

Figure 3:
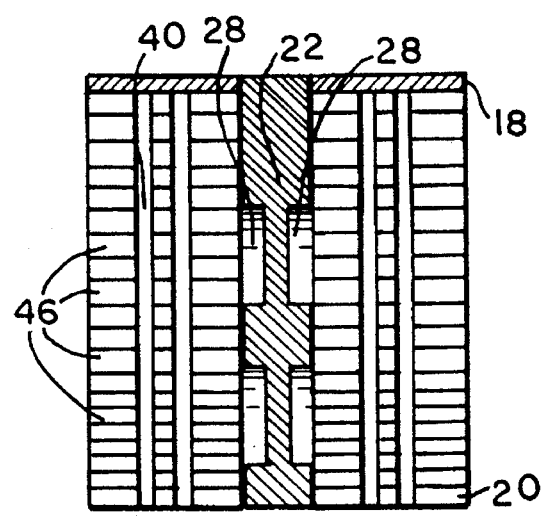
FIG. 3 is a cross-sectional view taken along lines 3—3 in FIG. 2.
Figure 2:
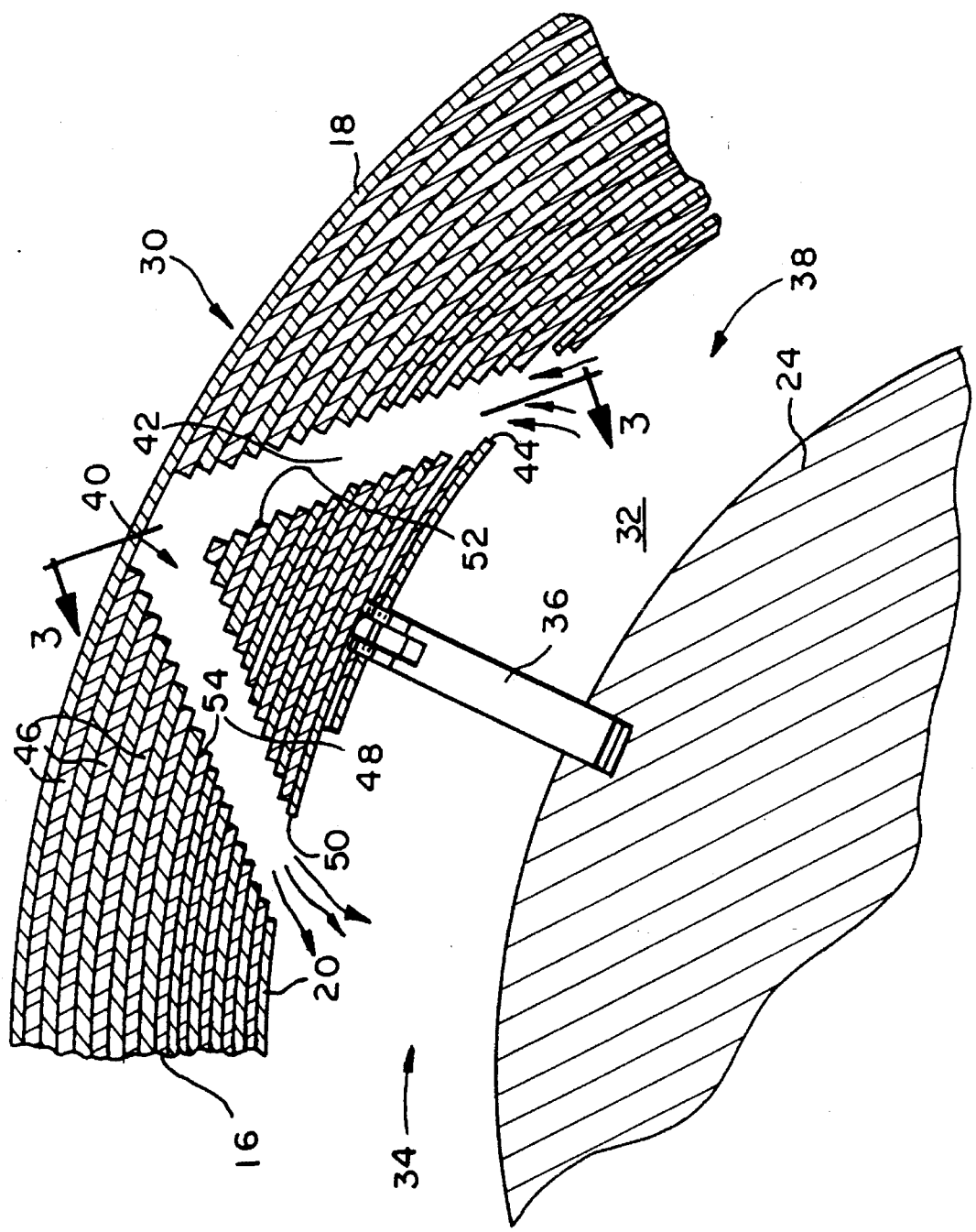
FIG. 2 is a fragmentary cross-sectional view of a portion of the generator assembly that is depicted in FIG. 1.

The end turn portion of the winding on rotor assembly 14 is depicted in FIG. 1, and includes a number of stacks 16 of conductive straps. Each stack 16 of straps includes a top strap 18, a bottom strap 20 and a number of intermediate straps 46, which are best shown in FIG. 2 and 3. Depending on the winding pattern that is being utilized, adjacent straps might not be in electrical contact. Adjacent straps may be in physical contact, or there might be a slight gap and/or insulation material therebetween. For purposes of this document, such adjacent straps are considered to be "in contact." It should be understood that top strap 18 and bottom strap 20 refer generally to the topmost and bottommost straps, respectively, and that the topmost and bottommost straps, as a result of the winding pattern, might not physically be the same strap throughout an entire end turn.

Blocking 22, preferably fiberglass, is provided between the stacks 16 of straps to provide structural support during rotation of the shaft 24 of the rotor assembly 14. As is common in such systems, a sliplayer is provided over the top-most straps 18 of the respective stacks 16, and a retaining ring 26 is fitted over the stacks 16 and the sliplayer to provide structural containment of the end turn assembly of rotor 14 during the high speed rotation that occurs during normal operation.

Generator assembly 10 is of the air-cooled variety. Referring briefly to FIG. 3, it will be seen that a number of ventilation passages 28 are defined in the fiberglass blocking 22 that is interposed between adjacent stacks 16 of conductive straps. Ventilation passages 28 are the primary conduits through which coolant flows to provide cooling to the end turn portion of rotor assembly 14. However, the cooling capacity of such passages are insufficient to permit the high power density that the designers of generator assembly 10 intend to facilitate. Accordingly, one important aspect of the invention is the provision of a supplemental ventilation structure 30 that is provided within the stacks 16 of straps themselves.

Looking now to FIGS. 2 and 3, it will be seen that a space 38 is defined between the bottom strap 20 of strap stack 16 and the outer circumferential surface of rotor shaft 24. As may be seen in FIG. 2, a zone block 36 is interposed between rotor shaft 24 and bottom strap 20 within the space 38. Zone block 36 separates space 38 into a high pressure zone 32 and a low pressure zone 34. In the preferred embodiment, the respective pressures in zones 32, 34 result from the application of a positive pressure of coolant into the high pressure zone 32. As is shown in FIG. 2, a number of stepped coolant passages 40 are defined within the stack 16 of straps to communicate the high pressure zone 32 with the low pressure zone 34. As may be seen in FIG. 2, stepped coolant passage 40 includes an inlet hole 44 that is defined in bottom strap 20 adjacent to the high pressure zone 32, a number of overlapping, ascending holes 52 that are defined, respectively, in a number of the intermediate straps 46 to define an ascending passage 42 that leads toward the top strap 18 and in the direction of the zone block 36 and low pressure zone 34. Stepped coolant passage 40 further includes an outlet hole 50 that is defined in bottom strap 20 adjacent to the low pressure zone 34. A descending passage 48 is in communication with the ascending passage 42 at a first end, and with the outlet hole 50 at a second, opposite end. Descending passage 48 is defined by a number of overlapping descending holes 54 that are defined in a corresponding member of the intermediate straps 46.

As may further be seen in FIG. 2, both the ascending holes 52 and descending holes 54 are constructed and arranged so that a first hole in a first strap is in communication with a second hole in a second adjacent strap, and so that the first and second holes are displaced from each other so that a portion of the first strap overlays the second hole, and a portion of the second strap overlays the first hole. As a result of this "staircase" or stepped configuration, the stepped passage 40 has a larger surface area exposed for heat transfer between a coolant and the strap stack 16 than a non-stepped passage would have.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. An improved rotor end winding assembly for an electrodynamic apparatus such as an electrical generator, comprising:

a rotor shaft;

a stack of a plurality of conductive straps, said stack of straps having an end turn portion, said stack of straps including a top strap, a bottom strap and a number of intermediate straps that are stacked between said top strap and said bottom strap;

a space defined between said rotor shaft and said bottom strap, said space being divided into at a high pressure zone and a low pressure zone by a zone block; and a coolant passage defined in said stack, said coolant passage comprising:

an inlet hole defined in said bottom strap adjacent to said high pressure zone;

a number of ascending holes defined, respectively, in a number of said intermediate straps to define an ascending passage that leads toward said top strap and in the direction of said zone block and low pressure zone;

an outlet hole defined in said bottom strap adjacent to said low pressure zone; and a number of descending holes that define a descending passage which is in communication with said ascending passage at a first end and with said outlet hole at a second end whereby coolant will flow from said high pressure zone to said low pressure zone to efficiently cool said stack of straps.

2. An assembly according to claim 1, wherein said descending holes are constructed and arranged so that a first hole in a first strap is in communication with a second hole in a second, adjacent strap, and so that said first and second holes are displaced from each other so that a portion of said first strap overlays said second hole, and a portion of said second strap overlays said first hole, whereby said stepped passage has a larger surface area exposed for heat transfer with a coolant than a non-stepped passage would have.

3. An assembly according to claim 1, wherein said ascending holes are constructed and arranged so that a first hole in a first strap is in communication with a second hole in a second, adjacent strap, and so that said first and second holes are displaced from each other so that a portion of said first strap overlays said second hole, and a portion of said second strap overlays said first hole, whereby said stepped passage has a larger surface area exposed for heat transfer with a coolant than a non-stepped passage would have.

4. An assembly according to claim 1, wherein said top strap has no hole defined therein that is in communication with said passage.

5. An assembly according to claim 1, wherein said ascending holes each have substantially the same size and shape.

6. An assembly according to claim 1, wherein said descending holes each have substantially the same size and shape.

7. An electrical generator assembly that has improved cooling characteristics that permits a higher power density, comprising:

a stator assembly;

a rotor mounted for rotation within said stator assembly, said rotor having a rotor shaft;

a stack of a plurality of conductive straps, said stack of straps having an end turn portion, said stack of straps including a top strap, a bottom strap and a number of intermediate straps that are stacked between said top strap and said bottom strap;

a space defined between said rotor shaft and said bottom strap, said space being divided into at a high pressure zone and a low pressure zone by a zone block; and a stepped coolant passage defined in said stack, said stepped coolant passage comprising:

an inlet hole defined in said bottom strap adjacent to said high pressure zone;

a number of overlapping ascending holes defined, respectively, in a number of said intermediate straps to define an ascending passage that leads toward said top strap and in the direction of said zone block and low pressure zone;

an outlet hole defined in said bottom strap adjacent to said low pressure zone; and a number of overlapping descending holes that define a descending passage which is in communication with said ascending passage at a first end and with said outlet hole at a second end whereby coolant will flow from said high pressure zone to said low pressure zone to efficiently cool said stack of straps.

8. An assembly according to claim 7, wherein said overlapping descending holes are constructed and arranged so that a first hole in a first strap is in communication with a second hole in a second, adjacent strap, and so that said first and second holes are displaced from each other so that a portion of said first strap overlays said second hole, and a portion of said second strap overlays said first hole, whereby said stepped passage has a larger surface area exposed for heat transfer with a coolant than a non-stepped passage would have.

9. An assembly according to claim 7, wherein said overlapping ascending holes are constructed and arranged so that a first hole in a first strap is in communication with a second hole in a second, adjacent strap, and so that said first and second holes are displaced from each other so that a portion of said first strap overlays said second hole, and a portion of said second strap overlays said first hole, whereby said stepped passage has a larger surface area exposed for heat transfer with a coolant than a non-stepped passage would have.

10. An assembly according to claim 7, wherein said top strap has no hole defined therein that is in communication with said passage.

11. An assembly according to claim 7, wherein said ascending holes each have substantially the same size and shape.

12. An assembly according to claim 7, wherein said descending holes each have substantially the same size and shape.

* * * * *